United States Patent
Li et al.

(10) Patent No.: US 10,084,712 B1
(45) Date of Patent: Sep. 25, 2018

(54) REAL-TIME TRAFFIC ANALYSIS OVER MOBILE NETWORKS

(71) Applicant: Verizon Patent and Licensing Inc., Arlington, VA (US)

(72) Inventors: Feng Li, Lexington, MA (US); Jae Won Chung, Lexington, MA (US); Xiaoxiao Jiang, Stoneham, MA (US); Stanley Junkert, Roanoke, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/467,762

(22) Filed: Mar. 23, 2017

(51) Int. Cl.
*H04L 12/851* (2013.01)
*H04L 12/26* (2006.01)

(52) U.S. Cl.
CPC ...... *H04L 47/2441* (2013.01); *H04L 43/0888* (2013.01); *H04L 43/16* (2013.01)

(58) Field of Classification Search
None
See application file for complete search history.

(56) References Cited

U.S. PATENT DOCUMENTS

| | | | | |
|---|---|---|---|---|
| 8,284,692 B2 * | 10/2012 | Arye | ...................... | H04L 43/18 370/232 |
| 8,539,064 B1 * | 9/2013 | Wang | ..................... | H04L 63/164 370/252 |
| 2006/0064746 A1 * | 3/2006 | Aaron | .................. | H04L 63/0428 726/13 |
| 2007/0088845 A1 * | 4/2007 | Memon | ................... | H04L 47/10 709/234 |
| 2009/0041114 A1 * | 2/2009 | Clark | .................. | H04L 43/0829 375/240.01 |
| 2010/0142397 A1 * | 6/2010 | Arye | ....................... | H04L 43/18 370/252 |
| 2012/0213133 A1 * | 8/2012 | Arye | ................... | H04L 12/5601 370/310.2 |
| 2013/0318253 A1 * | 11/2013 | Kordasiewicz | ......... | H04L 65/80 709/231 |

OTHER PUBLICATIONS

Brownlee et al., "Understanding Internet Tra c Streams: Dragon ies and Tortoises," Communications Magazine, IEEE, 40(10):110-117, Dec. 2002, 37 pages.
But et al., "Passive TCP Stream Estimation of RTT and Jitter Parameters," in Proceedings of the 3oth IEEE Conference on Local Computer Networks (LCN), Sydney, Australia, Nov. 2005, 7 pages.
Cardwell et al., "BBR: Congestion-Based Congestion Control," ACM Queue, 14, Sep.-Oct.: 20-53, Dec. 1, 2016, 8 pages.

(Continued)

*Primary Examiner* — Steven H D Nguyen

(57) ABSTRACT

A device can determine a set of flow characteristics associated with an encrypted traffic flow. The set of flow characteristics can include a cumulative length of payload packets included in the encrypted traffic flow, an average payload length of the payload packets, and a throughput associated with the encrypted traffic flow. The device can determine, based on the set of flow characteristics, whether the encrypted traffic flow is likely to be a video traffic flow. The device can cause the encrypted traffic flow to be managed based on whether the encrypted traffic flow is likely to be a video traffic flow.

20 Claims, 7 Drawing Sheets

(56) References Cited

OTHER PUBLICATIONS

Cisco System Inc., "Cisco Visual Network Index: Global Mobile Data Traffic Forecast Update," Technical report, Cisco System Inc., Feb. 2017, 35 pages.
Claypool et al., "Treatment-Based Traffic Signatures," in Proceeding of IMRG (IETF Internet Measurement Research Group) Workshop on Application Classification and Identification (WACI), Cambridge, MA, Oct. 2007, 2 pages.
Dukkipati et al., "Proportional Rate Reduction for TCP," in Proceedings of the 2011 ACM SIGCOMM Conference on Internet Measurement Conference, IMC'11, pp. 155-170, New York, NY, USA, Nov. 2011, 15 pages.
Flach et al., "An Internet-Wide Analysis of Traffic Policing," in Proceedings of the 2016 conference on ACM SIGCOMM 2016 Conference, pp. 468-482, Aug. 2016, 15 pages.
Google Inc., "Live encoder settings, bitrates, and resolutions: YouTube Help," https://support.google.com/youtube/answer/2853702?hl=en, Aug. 2016, 2 pages.
Gupta et al., "A survey of 5G network: architecture and emerging technologies," IEEE access, 3:1206-1232, Aug. 7, 2015, 27 pages.
Huang et al., "A Close Examination of Performance and Power Characteristics of 4G LTE Networks," in Proceedings of the 10$^{th}$ International Conference on Mobile Systems, Applications, and Services, MobiSys '12, pp. 225-238, New York, NY, Jun. 2012, 14 pages.
Huang et al., "An In-depth Study of LTE: Effect of Network Protocol and Application Behavior on Performance," in ACM SIGCOMM Computer Communication Review, SIGCOMM '13, pp. 363-374, New York, NY, Aug. 2013, 12 pages.
Kakhki et al., "BingeOn Under the Microscope: Understanding T-Mobile's Zero-Rating Implementation," in Proceedings of Internet-QoE Workshop, Aug. 2016, 6 pages.
Karagiannis et al., "BLINC: Multilevel Traffic Classification in the Dark," in Proceedings of the Conference on Applications, Technologies, Architectures, and Protocols for Computer Communications (SIGCOMM), pp. 229-240, Philadelphia, PA, Aug. 2005, 14 pages.
Khalife et al., "Performance of OpenDPI in Identifying Sampled Network Traffic," Journal of Networks, 8(1):71-81, Jan. 2013, 11 pages.
Kühlewind et al., "On the State of ERN and TCP Options on the Internet," in International Conference on Passive and Active Network Measurement, pp. 135-144, Mar. 2013, 10 pages.
Le et al., "Differential Congestion Notification: Taming the Elephants," in Proceedings of the 129$^{th}$ IEEE International Conference on Network Protocols (ICPN), pp. 118-128, Berlin, Germany, Oct. 2004, 11 pages.
Lederer, "Optimal Adaptive Streaming Formats MPEG-DASH & HLS Segment," https://bitmovin.com/mpeg-dash-hls-segment-length/, Apr. 2015, 10 pages.
Li et al., "Treatment-based traffic classification for residential wireless networks," in 2015 International Conference on the Computing, Networking and Communications (ICNC), pp. 160-165, Feb. 2015, 6 pages.
Li et al., "Classifiers Unclassified: An Efficient Approach to Revealing IP Traffic Classification Rules," in Proceedings of the 2016 ACM on Internet Measurement Conference, pp. 239-245, Nov. 2016, 7 pages.
Martin et al., "Characterizing Netflix bandwidth consumption," in 2013 IEEE 10$^{th}$ Consumer Communications and Networking Conference (CCNC), pp. 230-0235, Dec. 2013, 6 pages.
Kakhki et al., "Identifying Traffic Differentiation in Mobile Networks," in Proceedings of the 2015 ACM Conference on Internet Measurement Conference, pp. 239-251, Oct. 2015, 13 pages.
Moore et al., "The CoralReef Software Suite as a Tool for System and Network Administrators," in Proceedings fo the 15$^{th}$ USENIX Conference on System Administrations (LISA), pp. 133-144, San Diego, CA, 2001, 10 pages.
Palazzi et al., "Wireless Home Entertainment Center: Reducing Last Hop Delays for Real-Time Applications," in Proceedings of the ACM SIGCHI International Conference on Advances in Computer Entertainment Technology, p. 67, Hollywood, CA, Jun. 2006, 8 pages.
Roskind, "QUIC: Quick UDP Internet Connections Multiplexed Stream Transport over UDP," IETF-88 TSV Area Presentation, Nov. 2013, 25 pages.
Roughan et al., "Class-of-Service Mapping for QoS: a Statistical Signature-based Approach to IP Traffic Classification," in Proceedings of the ACM SIGCOMM Internet Measurement Conference, Taormina, Sicily, Italy, Oct. 2004, 14 pages.
Snellman, "Mobile TCP Optimization: Lessons Learned in Production," Technical Report, Telco. Networks, Aug. 2015, 21 pages.
Wu, "ARMOR—Adjusting Repair and Media Scaling with Operations Research for Streaming Video," PhD thesis, Worcester Polytechnic Institute, May 2006, 213 pages.
Xu et al., "Identifying Diverse Usage Behaviors of Smartphone apps," in Proceedings of the 2011 ACM SIGCOMM conference on Internet Measurement Conference, pp. 329-344, Nov. 2011, 13 pages.
Zhang et al., "On the Characteristics and Origins of Internet Flow Rates," in Proceedings of the Conference on Applications, Technologies, Architectures, and Protocols for Computer Communications (SIGCOMM), pp. 309-322, Pittsburgh, PA, Aug. 2002, 14 pages.

\* cited by examiner

REAL-TIME TRAFFIC ANALYSIS OVER MOBILE NETWORKS

BACKGROUND

Video optimization can be utilized in a service provider network to improve consumer viewing experience by, for example, reducing start times, reducing frequency of re-buffering events, or the like. Video optimization can also aim to reduce an amount of network bandwidth consumed by a video traffic flow. Thus, in order to perform video optimization, the service provider needs to identify video traffic flows in the service provider network. Typical techniques for identifying video traffic flows include, for example, deep packet inspection, using a model trained on a dataset, and/or the like. However, such techniques can be inaccurate in practice.

DETAILED DESCRIPTION OF PREFERRED EMBODIMENTS

The following detailed description of example implementations refers to the accompanying drawings. The same reference numbers in different drawings can identify the same or similar elements.

As radio link capacities increase and latency degrades, a service provider can deploy a network device (sometimes referred to as a "middle-box") to achieve higher throughput over a network. However, because of the widespread use of transport layer security (TLS) and/or secure sockets layer (SSL) encryption, such a device can mistreat an encrypted video traffic flow with an inappropriate scheme and/or can not correctly identify the encrypted traffic flow as a video traffic flow, even with use of a traffic inspection technique, such as a deep packet inspection (DPI) technique.

Implementations described herein provide a flow identification device capable of determining whether an encrypted traffic flow is likely to be a video traffic flow based on a set of flow characteristics associated with the encrypted traffic flow, while preventing any leak of private information associated with the encrypted traffic flow. In some implementations, the flow identification device can cause the encrypted traffic flow to be managed based on whether the encrypted traffic flow is likely to be a video traffic flow, which results in conservation of network resources, efficient use of network resources, and/or improved user experience associated with the encrypted traffic flow.

Figure 1:
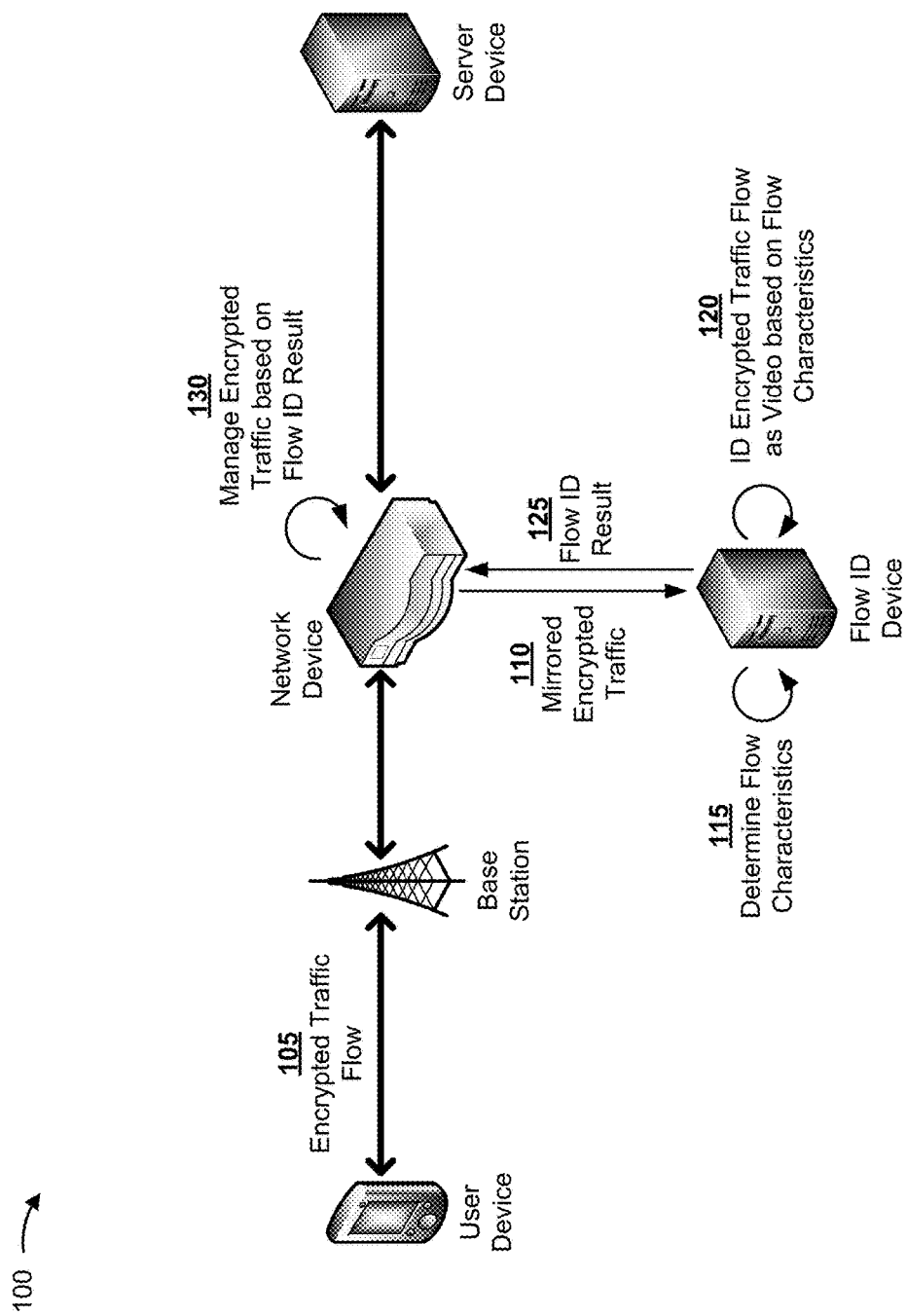
FIG. 1 is a diagram of an overview of an example implementation described herein.

FIG. 1 is a diagram of an overview of an example implementation 100 described herein. As shown by reference number 105, a user device and a server device can participate in a secure session in which encrypted traffic can be exchanged (e.g., a SSL session, a TLS session, a secure hypertext transfer protocol (HTTPS) session, a quick user datagram protocol internet connection (QUIC) session, or the like). As shown by reference number 110, a flow identification device, associated with identifying whether the encrypted traffic flow is a video traffic flow, receives encrypted traffic, associated with the encrypted traffic flow. For example, as shown, the flow identification device can receive the encrypted traffic based on the traffic being mirrored by a network device, such as a packet data network gateway (PGW).

As shown by reference number 115, the flow identification device can determine a set of flow characteristics associated with the encrypted traffic flow. The set of flow characteristics can include, for example, information identifying a cumulative length of payload packets associated with the encrypted traffic flow, information that identifies an average payload length of the payload packets associated with the encrypted traffic flow, information that identifies a throughput associated with the encrypted traffic flow, or the like.

As shown by reference number 120, the flow identification device can determine, based on the set of flow characteristics, whether the encrypted traffic flow is likely to be a video traffic flow (e.g., a high definition (HD) traffic flow). As shown by reference number 125, the flow identification device can provide (e.g., to the network device) information associated with a result of whether the encrypted traffic flow is likely to be a video traffic flow. As shown by reference number 130, the network device can manage the encrypted traffic flow based on the information associated with the result provided by the flow identification device.

In this way, a flow identification device can determine whether an encrypted traffic flow is a video traffic flow, and can cause the encrypted traffic flow to be managed based on whether the encrypted traffic flow is a video traffic flow, thereby conserving network resources, ensuring efficient use of network resources, and/or improving user experience, while maintaining privacy associated with the encrypted traffic flow.

As indicated above, FIG. 1 is provided merely as an example. Other examples are possible and can differ from what was described with regard to FIG. 1. Notably, while techniques described herein are described in the context of a flow identification device capable of determining whether an encrypted traffic flow is a video traffic flow (and managing the encrypted traffic flow, accordingly), other implementations are possible. For example, these techniques can be used for other types of traffic flows, such as an encrypted traffic flow associated with an application update, an operating system update, a file transfer, or another type of relatively large traffic transfer.

Figure 2:
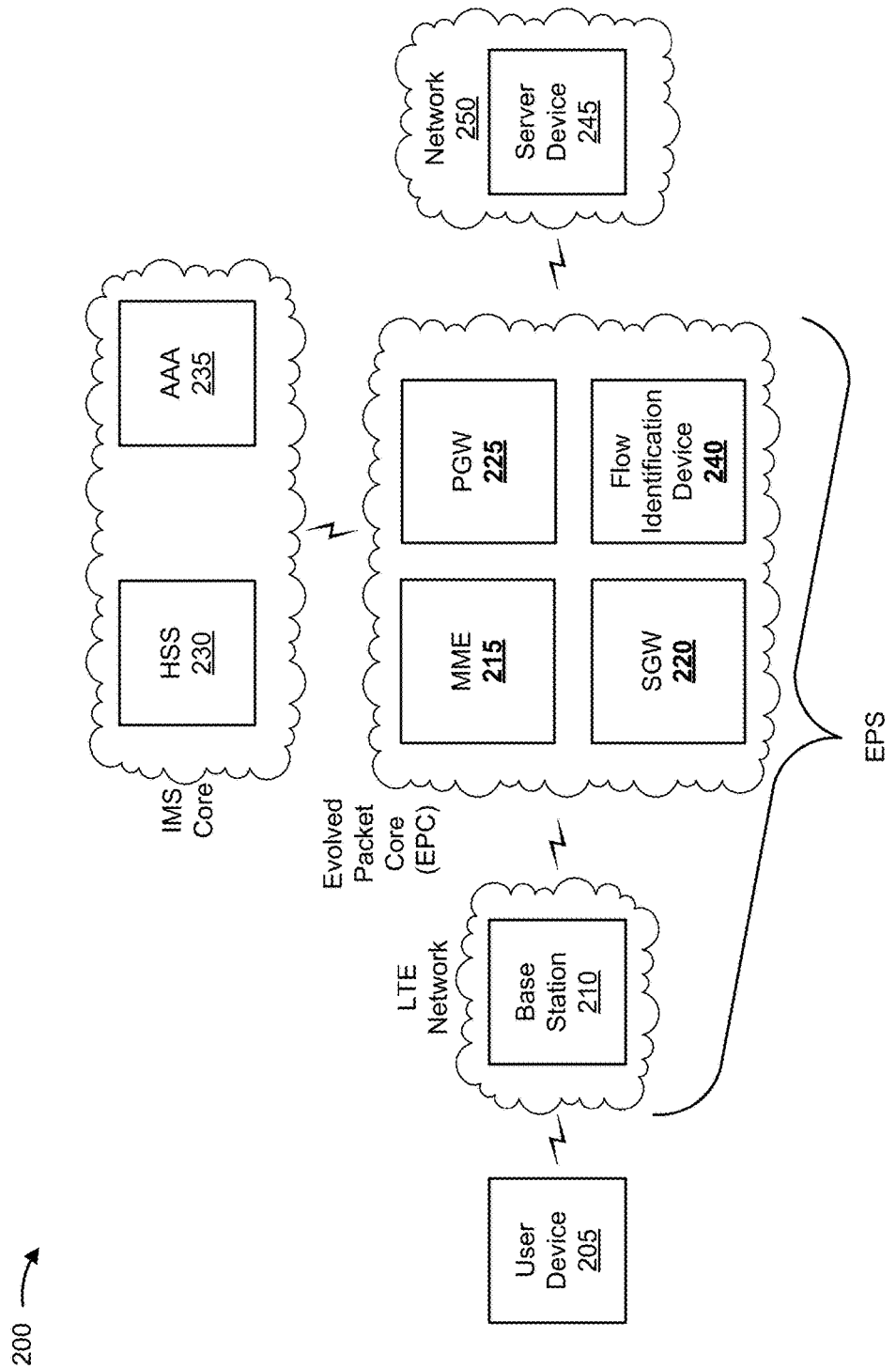
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 205; a base station 210; a mobility management entity device (MME) 215; a serving gateway (SGW) 220; a packet data network gateway (PGW) 225; a home subscriber server (HSS) 230; an authentication, authorization, and accounting server (AAA) 235; a flow identification device 240, a server device 245, and a network 250. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a third generation (3G) network.

Environment 200 can include an evolved packet system (EPS) that includes an LTE network and/or an evolved packet core (EPC) that operate based on a third generation partnership project (3GPP) wireless communication standard. The LTE network can include a radio access network (RAN) that includes one or more base stations 210 that take the form of evolved Node Bs (eNBs) via which user device 205 communicates with the EPC. The EPC can include MME 215, SGW 220, PGW 225, and/or flow identification device 240 that enable user device 205 to communicate with network 250 and/or an Internet protocol (IP) multimedia subsystem (IMS) core. The IMS core can include HSS 230 and/or AAA 235, and can manage device registration and authentication, session initiation, etc., associated with user devices 205. HSS 230 and/or AAA 235 can reside in the EPC and/or the IMS core.

User device 205 includes one or more devices capable of receiving, generating, storing, processing, and/or providing information via a radio access network. For example, user device 205 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 205 can participate in a secure session, used for exchanging encrypted traffic, with another device, such as server device 245.

Base station 210 can include one or more devices capable of transferring traffic, such as audio, video, text, and/or other traffic, destined for and/or received from user device 205. In some implementations, base station 210 can include an eNB associated with the LTE network that receives traffic from and/or sends traffic to network 250 via SGW 220 and/or PGW 225. Additionally, or alternatively, one or more base stations 210 can be associated with a RAN that is not associated with the LTE network. Base station 210 can send traffic to and/or receive traffic from user device 205 via an air interface. In some implementations, base station 210 can include a small cell base station, such as a base station of a microcell, a picocell, and/or a femtocell.

MME 215 can include one or more devices, such as one or more server devices, capable of managing authentication, activation, deactivation, and/or mobility functions associated with user device 205. In some implementations, MME 215 can perform operations relating to authentication of user device 205. Additionally, or alternatively, MME 215 can facilitate the selection of a particular SGW 220 and/or a particular PGW 225 to serve traffic to and/or from user device 205. MME 215 can perform operations associated with handing off user device 205 from a first base station 210 to a second base station 210 when user device 205 is transitioning from a first cell associated with the first base station 210 to a second cell associated with the second base station 210. Additionally, or alternatively, MME 215 can select another MME (not pictured), to which user device 205 should be handed off (e.g., when user device 205 moves out of range of MME 215).

SGW 220 can include one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 can aggregate traffic received from one or more base stations 210 associated with the LTE network, and can send the aggregated traffic to network 250 (e.g., via PGW 225) and/or other network devices associated with the EPC and/or the IMS core. SGW 220 can also receive traffic from network 250 and/or other network devices, and can send the received traffic to user device 205 via base station 210. Additionally, or alternatively, SGW 220 can perform operations associated with handing off user device 205 to and/or from an LTE network.

PGW 225 can include one or more devices capable of providing connectivity for user device 205 to external packet data networks (e.g., other than the depicted EPC and/or LTE network). For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 can aggregate traffic received from one or more SGWs 220, and can send the aggregated traffic to network 250. Additionally, or alternatively, PGW 225 can receive traffic from network 250, and can send the traffic to user device 205 via SGW 220 and base station 210. PGW 225 can record data usage information (e.g., byte usage), and can provide the data usage information to AAA 235. In some implementations, PGW 225 can provide mirrored encrypted traffic, associated with a secure session between user device 205 and server device 245, to flow identification device 240.

HSS 230 can include one or more devices, such as one or more server devices, capable of managing (e.g., receiving, generating, storing, processing, and/or providing) information associated with user device 205. For example, HSS 230 can manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS 230 can provide this information to one or more other devices of environment 200 to support the operations performed by those devices.

AAA 235 can include one or more devices, such as one or more server devices, that perform authentication, authorization, and/or accounting operations for communication sessions associated with user device 205. For example, AAA 235 can perform authentication operations for user device 205 and/or a user of user device 205 (e.g., using one or more credentials), can control access, by user device 205, to a service and/or an application (e.g., based on one or more restrictions, such as time-of-day restrictions, location restrictions, single or multiple access restrictions, read/write restrictions, etc.), can track resources consumed by user device 205 (e.g., a quantity of voice minutes consumed, a quantity of data consumed, etc.), and/or can perform similar operations.

Flow identification device 240 can include one or more devices capable of determining whether an encrypted traffic flow, associated with a secure session between user device 205 and server device 245, is a video traffic flow. For example, flow identification device can include a server or a group of servers. In some implementations, flow identification device 240 can cause an encrypted traffic flow to be managed in a particular manner based on a whether the encrypted traffic flow is a video traffic flow, as described herein.

Server device 245 can include a device capable of communicating with user device 205 via a secure session used to send and/or receive encrypted traffic. For example, server device 245 can include a server or a group of servers. In some implementations, server device 245 can host an application (e.g., a video service) associated with providing encrypted traffic to user device 205.

Network 250 can include one or more wired and/or wireless networks. For example, network 250 can include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
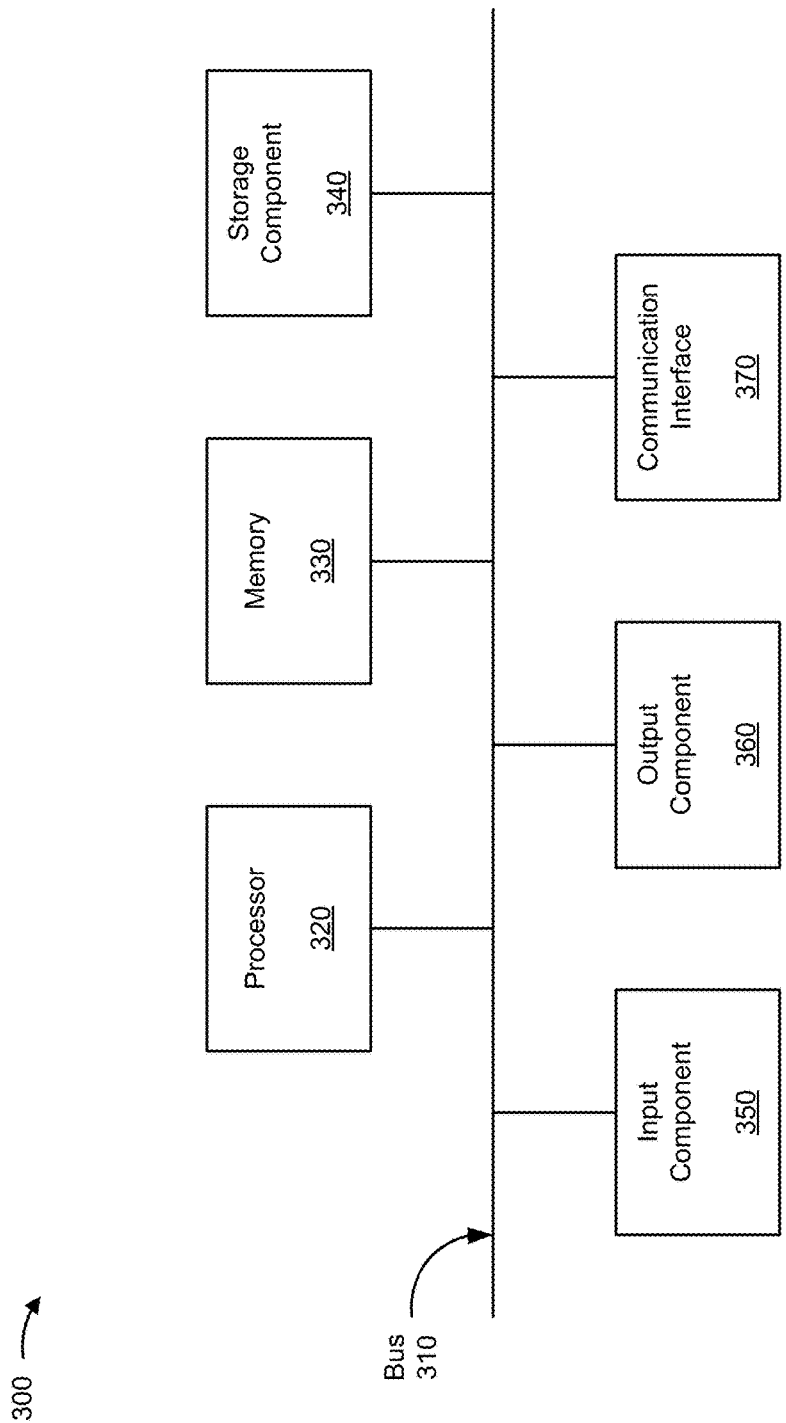
FIG. 3 is a diagram of example components of one or more devices of FIG. 2.

FIG. 3 is a diagram of example components of a device 300. Device 300 can correspond to user device 205, base station 210, MME 215, SGW 220, PGW, 225, HSS 230, AAA 235, flow identification device 240, and/or server device 245. In some implementations, user device 205, base station 210, MME 215, SGW 220, PGW, 225, HSS 230, AAA 235, flow identification device 240, and/or server device 245 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
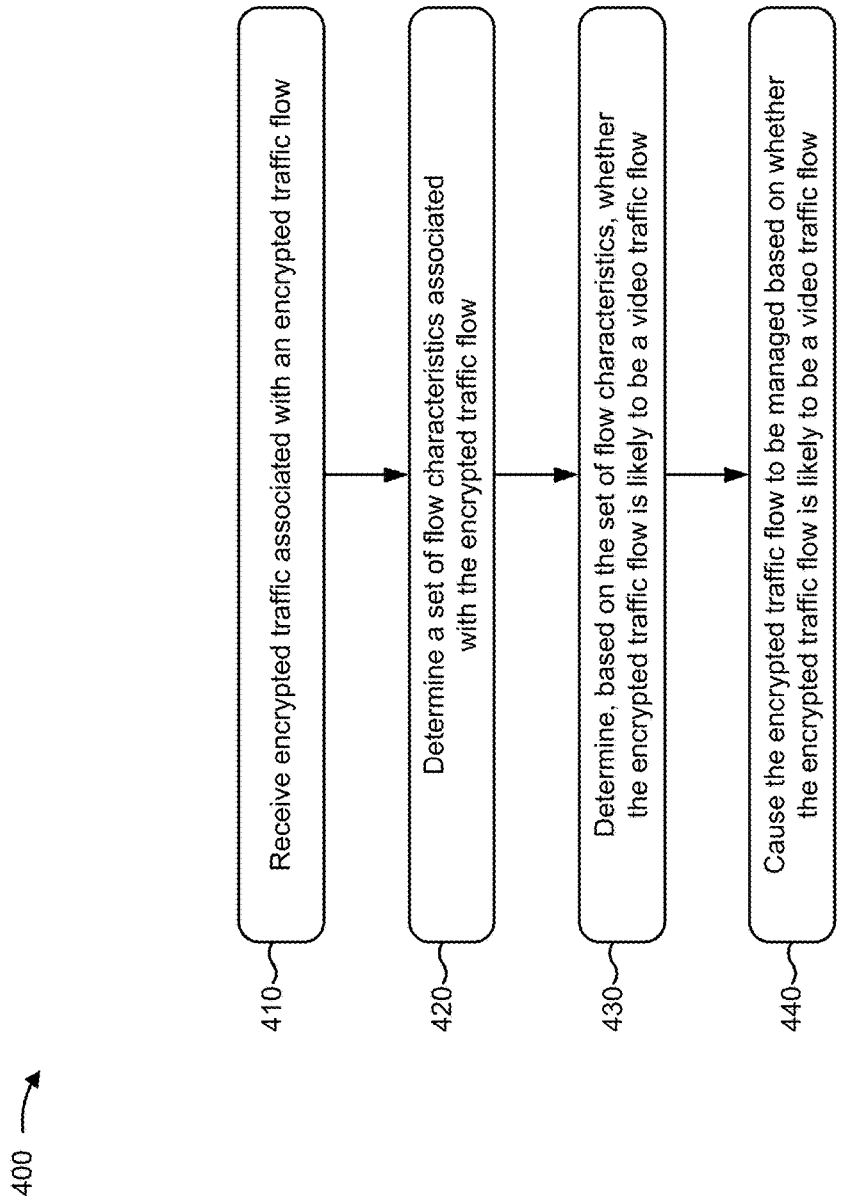
FIG. 4 is a flow chart of an example process for determining, based on a set of flow characteristics associated with an encrypted traffic flow, whether the encrypted traffic flow is likely to be a video traffic flow.

FIG. 4 is a flow chart of an example process 400 for determining, based on a set of flow characteristics associated with an encrypted traffic flow, whether the encrypted traffic flow is likely to be a video traffic flow. In some implementations, one or more process blocks of FIG. 4 can be performed by flow identification device 240. In some implementations, one or more process blocks of FIG. 4 can be performed by another device or a group of devices separate from or including flow identification device 240, such as user device 205, base station 210, MME 215, SGW 220, PGW 225, HSS 230, AAA 235, and/or server device 245.

As shown in FIG. 4, process 400 can include receiving encrypted traffic associated with an encrypted traffic flow (block 410). For example, flow identification device 240 can receive encrypted traffic associated with an encrypted traffic flow.

In some implementations, flow identification device 240 can receive encrypted traffic associated with an encrypted traffic flow between user device 205 and server device 245. For example, user device 205 and server device 245 can participate in a secure session (e.g., a TLS session, an SSL session, an HTTPS session, a QUIC session, or the like), via which encrypted traffic can be exchanged. Here, a network device via which encrypted traffic, associated with the encrypted traffic flow, is transferred (e.g., PGW 225), can mirror the encrypted traffic to flow identification device 240. In other words, the network device can copy the encrypted traffic flow, and provide the copied encrypted traffic flow (e.g., copies of packets included in the encrypted traffic flow) to flow identification device 240.

Additionally, or alternatively, flow identification device 240 can be arranged such that the encrypted traffic flow is transferred via flow identification device 240, and flow identification device 240 can receive the encrypted traffic associated with the encrypted traffic flow.

As further shown in FIG. 4, process 400 can include determining a set of flow characteristics associated with the encrypted traffic flow (block 420). For example, flow identification device 240 can determine a set of flow characteristics associated with the encrypted traffic flow.

The set of flow characteristics can include one or more items of information associated with a property and/or a metric of the encrypted traffic flow. In some implementations, the set of flow characteristics can include information associated with server device 245, such as a host name, a server name indicator (SNI), a network address of server device 245 (e.g., an IP address), a domain name associated with server device 245, or the like. Additionally, or alternatively, the set of flow characteristics can include information associated with user device 205, such as an international mobile subscriber identity (IMSI), a device name, a network address of user device 205, or the like.

Additionally, or alternatively, the set of flow characteristics can include information that identifies a total number of payload packets included in the encrypted traffic flow (e.g., a total number of transport layer packets in the encrypted traffic flow that include a payload). In some implementations, flow identification device 240 can use a counter to track and/or monitor the number of payload packets included in the encrypted traffic flow. For example, in some implementations, flow identification device 240 can identify whether a given packet includes a payload packet and, if so, can increase the total number of payload packets, associated with the counter, by one. In some implementations, a packet does not include a payload when the packet is, for example, a flow control packet that does not carry application data. As described herein, the total number of payload packets included in the encrypted traffic flow can be represented by variable c.

Additionally, or alternatively, the set of flow characteristics can include information that identifies a cumulative length of the payload packets included in the encrypted traffic flow. In some implementations, flow identification device 240 can use a counter to track and/or monitor the cumulative length of the payload packets. For example, based on determining that a packet is a payload packet, flow identification device 240 can determine a length of the payload (e.g., total packet length minus a header length), and can increase the cumulative length of the payload packets, associated with the counter, by an amount corresponding to the payload length of the packet. As described herein, the cumulative length of the payload packets included in the encrypted traffic flow can be represented by variable S.

Additionally, or alternatively, the set of flow characteristics can include information that identifies an elapsed traffic flow time. For example, flow identification device 240 can identify a time at which a first payload packet in the encrypted traffic flow is received by flow identification device 240, and can start a timer. Here, the elapsed traffic flow time represents an amount of time that has passed since receipt of a first payload packet (i.e., since the start of the timer). As described herein, the elapsed traffic flow time can be represented by variable $t_e$.

Additionally, or alternatively, the set of flow characteristics can include information that identifies an average payload length of the payload packets. In some implementations, flow identification device 240 can determine the average payload length based on the cumulative length of the payload packets and the total number of payload packets. For example, flow identification device 240 can divide the cumulative length of the payload packets by the total number of payload packets in order to determine the average payload length. As described herein, the average payload length of the payload packets can be represented by variable L.

Additionally, or alternatively, the set of flow characteristics can include information that identifies a throughput associated with the encrypted traffic flow, such as an application layer throughput. In some implementations, flow identification device 240 can determine the throughput based on the cumulative length of the payload packets and the elapsed traffic flow time. For example, flow identification device 240 can divide the cumulative length of the payload packets by the elapsed traffic flow time in order to determine the throughput associated with the encrypted traffic flow. As described herein, the throughput associated with the encrypted traffic flow can be represented by as variable R.

In some implementations, flow identification device 240 can determine the set of flow characteristics periodically (e.g., once every second during the encrypted traffic flow, every 5 seconds, or the like. Additionally, or alternatively, flow identification device 240 can determine the set of flow characteristics in real-time or near real-time (e.g., as flow identification device 240 receives the traffic). Additionally, or alternatively, flow identification device 240 can determine the set of flow characteristics based on an indication provided by another device (e.g., PGW 225). Additionally, or alternatively, flow identification device 240 can determine the set of flow characteristics based on user input (e.g., by a user associated with flow identification device 240). Notably, flow identification device 240 can determine the set of flow characteristics without storing the encrypted traffic flow packets, decrypting the encrypted traffic, and/or inspecting contents of the encrypted traffic packet, thereby preventing any leakage of private information.

As further shown in FIG. 4, process 400 can include determining, based on the set of flow characteristics, whether the encrypted traffic flow is likely to be a video traffic flow (block 430). For example, flow identification device 240 determine, based on the set of flow characteristics, whether the encrypted traffic flow is likely to be a video traffic flow.

In some implementations, flow identification device 240 can determine whether the encrypted traffic flow is likely to be a video traffic flow based on a flow identification algorithm associated with comparing one or more of the set of flow characteristics to one or more corresponding thresholds.

For example, flow identification device 240 can have access to information associated with a set of thresholds, such as a threshold length (e.g., 60 kilobytes (KB)) for a video segment (represented herein as variable $T_v$). In some implementations, the threshold length for a video segment can be selected based on an initial buffering time of for a video connection, which can be, for example, in a range from approximately 2 seconds to approximately 10 seconds.

As another example, flow identification device 240 can have access to information associated with a threshold throughput (e.g., 300 kilobits per second (kbps)) for a video traffic flow (represented herein as variable $R_v$). In some implementations, the threshold throughput for a video traffic flow can be selected based on a lowest expected video encoding rate for a given video provider. In some implementations, the threshold throughput for a video traffic flow can be as low as approximately 240 kbps.

As an additional example, flow identification device 240 can have access to information associated with a threshold throughput (e.g., 128 kbps) for a non-video traffic flow (represented herein as variable $R_a$). In some implementations, the threshold throughput for the non-video traffic flow can be selected based on a highest expected audio rate for a given content provider (e.g., 128 kbps).

As another example, flow identification device 240 can have access to information associated with a packet length threshold (e.g., 900 bytes (B)) for a video traffic flow (represented herein as variable $L_v$, and sometimes referred to as a threshold average payload length of payload packets for a video traffic flow). In some implementations, the packet length threshold for a video flow can be selected based on a maximum transmission unit (MTU) size (e.g, a default MTU size without IP and transport layer headers). For example, the packet length threshold for a video flow can be selected as a size equal to approximately two-thirds of the MTU size (e.g., 900 B can be selected when the MTU size is equal to 1500 B).

As yet another example, flow identification device 240 can have access to information associated with a packet length threshold (e.g., 450 B) for a non-video traffic flow (represented herein as variable $L_a$, and sometimes referred to as a threshold average payload length of payload packets for a non-video traffic flow). In some implementations, the packet length threshold for a non-video flow can be selected based on the MTU size. For example, the packet length threshold for a video flow can be selected as a size equal to approximately one-third of the MTU size (e.g., 450 B can be selected when the MTU size is equal to 1500 B).

In some implementations, such thresholds can be configurable by a user and/or by implementing a machine learning technique that automatically updates the thresholds based on correctly identified video traffic flows.

In some implementations, flow identification device 240 can compare one or more of the set of flow characteristics to the set of thresholds in order to determine whether the encrypted traffic flow is likely to be a video traffic flow. As particular example, flow identification device 240 can be configured to determine that the encrypted traffic flow is likely to be a video traffic flow if (1) the cumulative length of the payload packets is greater than or equal to the threshold length for a video segment ($S \geq T_v$), (2) the throughput of the encrypted traffic flow is greater than or equal to the threshold throughput for a video traffic flow ($R \geq R_v$), and (3) the average payload length of payload packets is greater than or equal to the packet length threshold for a video traffic flow ($L \geq L_v$). Similarly, flow identification device 240 can be configured to determine that the encrypted traffic flow is unlikely to be a video traffic flow if the cumulative length of the payload packets is less than the threshold length for a video segment ($S < T_v$), (2) the throughput of the encrypted traffic flow is less than the threshold throughput for a non-video traffic flow ($R < R_a$), and (3) the average payload length of payload packets is less than the packet length threshold for a non-video traffic flow ($L < L_a$).

In some implementations, if neither set of thresholds are satisfied, then flow identification device 240 can determine that that the encrypted traffic flow can be (i.e., is not likely to be and is not unlikely to be) a video traffic flow. In such a case, flow identification device 240 can continue determining flow characteristics and make another determination of whether the encrypted traffic flow is likely to be a video traffic flow at a later time (e.g., periodically until flow identification device 240 determines that the encrypted traffic flow is likely to be a video traffic flow or is unlikely to be a video traffic flow).

In some implementations, the flow detection algorithm, configured on flow identification device 240, can also include determining, based on the information associated with server device 245 (e.g., the host name, the SNI, the IP address) whether server device 245 can be associated with a video service. For example, before comparing the set of flow characteristics to the corresponding thresholds, flow identification device 240 can determine (e.g., via a reverse DNS lookup based on the IP address of server device 245) whether server device 245 is associated with a video service (e.g., whether server device 245 is server that can be associated with providing a video service, such as YouTube, Netflix, or the like). In some implementations, if server device 245 is associated with a video service, then flow identification device 240 can proceed with the flow identification algorithm (e.g., in order to determine whether the encrypted traffic flow is actually associated with providing video). Otherwise, flow identification device 240 can abort identification of the encrypted traffic flow, thereby conserving processing and/or network resources that would otherwise be consumed.

In some implementations, flow identification device 240 can determine a score and/or a confidence metric associated with the determination of whether the encrypted traffic flow is likely to be a video traffic flow. For example, flow identification device 240 can determine the score and/or the confidence metric based on a degree to which a flow characteristic satisfies a threshold (e.g., based on an amount by which the flow characteristic exceeds a corresponding threshold, based on an amount by which the flow characteristic fails to exceed the corresponding threshold, or the like). In some implementations, flow identification device 240 can determine the score and/or the confidence metric based on a cumulative score associated with multiple flow characteristics, a weighted average score associated with the multiple flow characteristics, or the like.

In some implementations, flow identification device 240 can determine whether the encrypted traffic flow is likely to be a video traffic flow in another manner (e.g., using a different flow identification algorithm) and/or based on one or more other flow characteristics).

In some implementations, flow identification device 240 can determine whether the encrypted traffic flow is likely to be a video traffic flow in order to cause the encrypted traffic flow to be managed in order to improve performance associated with the video traffic flow and/or to reduce bandwidth consumption, as described below. Notably, while implementations described herein are described in the context of video traffic flows, these techniques can be useful for other types of encrypted traffic flows, such as an encrypted traffic flow associated with an application update, an operating system update, a file transfer, or another type of relatively large traffic transfer.

As further shown in FIG. 4, process 400 can include causing the encrypted traffic flow to be managed based on whether the encrypted traffic flow is likely to be a video traffic flow (block 440). For example, flow identification device 240 can cause the encrypted traffic flow to be managed based on whether the encrypted traffic flow is likely to be a video traffic flow.

In some implementations, flow identification device 240 can cause the flow to be managed based on providing an indication of whether the encrypted traffic flow is likely to be a video traffic flow. For example, if flow identification device 240 determines that the encrypted traffic flow is likely to be an encrypted traffic flow, then flow identification device 240 can provide, to one or more other devices associated with processing and/or transferring the encrypted traffic flow (e.g., PGW 225), an indication that the encrypted traffic flow is likely to be a video traffic flow. Here, the one or more other devices can receive the indication, and can manage the encrypted traffic flow in order to increase performance of the video and/or conserve network resources.

As a particular example, in some cases, a network operator can wish to implement a pacing technique to video traffic flows (e.g., to avoid bursty traffic and even the encrypted traffic flow). Such a technique can include, for example, rate limiting delivery of the video traffic to be "just in time" (i.e., at a rate fast enough to smoothly play the video without causing stalls due to buffer under runs). In some implementations, pacing can be referred to as traffic shaping, rate shaping, rate limiting, or the like. In some implementations, causing the encrypted traffic flow to be managed using such a technique can reduce wastage of network resources. For example, the network can be capable of delivering the video traffic at a rate faster than a video player application (e.g., hosted by user device 205) can consume. Here, network bandwidth can be wasted when, for example, user device 205 stops playing the video (e.g., when the user stops the video playback before the video ends), since buffered video traffic, already provided to user device 205 via the network, is unused and discarded.

In some implementations, flow identification device 240 can cause another optimization technique to be applied to the encrypted video traffic flow, such as transrating, transcoding, implementing an adaptive bitrate technique, or the like.

As another example, if flow identification device 240 determines that the encrypted traffic flow is unlikely to be a video traffic flow, then flow identification device 240 can provide, to one or more devices associated with processing and/or transferring the encrypted traffic flow, an indication that the encrypted traffic flow is unlikely to be a video traffic flow. Here, the one or more other devices can receive the indication, and can manage the encrypted traffic flow to increase throughput associated with the encrypted traffic flow (e.g., since video-related issues might not be of concern for a non-video traffic flow).

As another example, if flow identification device 240 determines that the encrypted traffic flow can be a video traffic flow, then flow identification device 240 can provide, to one or more devices associated with processing and/or transferring the encrypted traffic flow, an indication that the encrypted traffic flow can be a video traffic flow. Here, the one or more other devices can receive the indication, and can manage the encrypted traffic flow in order to increase performance, conserve network resources, and/or increase throughput. For example, upon receiving the indication the encrypted traffic flow can be a video traffic flow, PGW 225 can apply a combination of the techniques applied when the encrypted traffic flow is likely to be a video traffic flow and the techniques applied when the encrypted traffic flow is unlikely to be a video traffic. In some implementations, PGW 225 can apply these techniques until flow identification device 240 makes another determination of whether the encrypted traffic flow is likely to be a video traffic flow is made (e.g., at a later time).

Additionally, or alternatively, flow identification device 240 can cause a particular quality of service (QoS) level and/or traffic treatment to be applied to the encrypted traffic flow based on whether the encrypted traffic flow is likely to be a video traffic flow. For example, in some implementations, a service provider may wish to apply a particular QoS level and/or a particular type of traffic treatment to video flow traffic for purposes of performance analysis and/or improvement associated with the service provider network.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
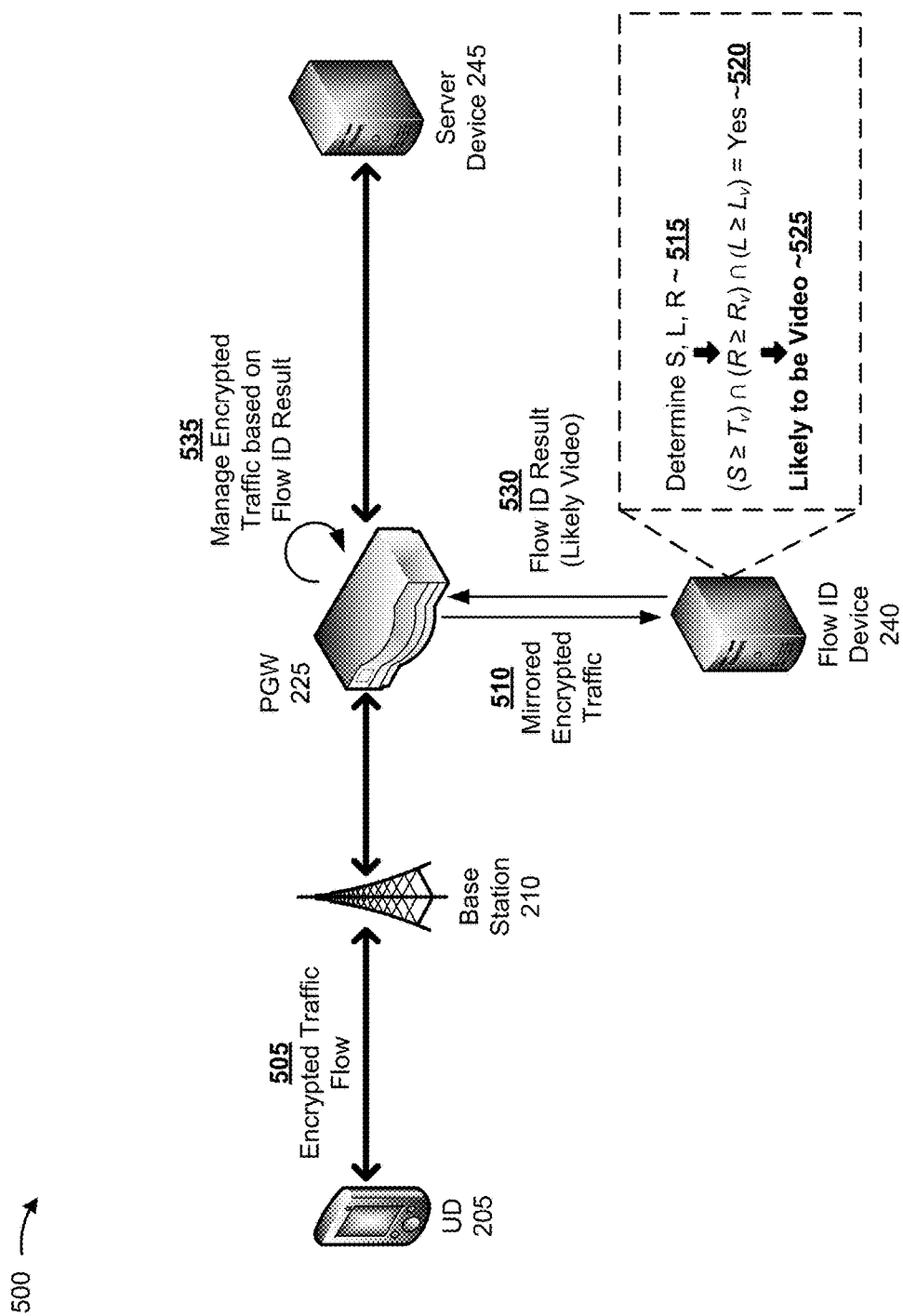
FIG. 5 is a diagram of an example implementation relating to the example process shown in FIG. 4.

FIG. 5 is a diagram of an example implementation 500 relating to example process 400 shown in FIG. 4. As shown in FIG. 5, and by reference number 505, user device 205 and server device 245 can participate in a secured session (e.g., a SSL session, a TLS session, a HTTPS session, a QUIC session, or the like) in which encrypted traffic can be exchanged. As shown by reference number 510, flow identification device 240 receives the encrypted traffic, associated with the encrypted traffic flow, based on the traffic being mirrored by PGW 225.

As shown by reference number 515, based on receiving the encrypted traffic, flow identification device 240 determines a set of flow characteristics, associated with the encrypted traffic flow, including a cumulative length of payload packets included in the encrypted traffic flow (S), an average payload length of the payload packets (L), and a throughput associated with the encrypted traffic flow (R). As shown by reference number 520, flow identification device 240 determines that the cumulative length of the payload packets is greater than or equal to a threshold length for a video segment ($S \geq T_v$), that the throughput of the encrypted traffic flow is greater than or equal to a threshold throughput for a video traffic flow ($R \geq R_v$), and that the average payload length of payload packets is greater than or equal to a threshold average payload length for a video traffic flow ($L \geq L_v$). As shown by reference number 525, based on the three thresholds being satisfied, flow identification device 240 determines that the encrypted traffic flow is likely to be a video traffic flow. As show by reference number 530, based on the determination, flow identification device 240 provides, to PGW 225, information associated with a result indicating that the encrypted traffic flow is likely to be a video traffic flow. As show by reference number 535, PGW 225 manages the encrypted traffic flow based on the result provided by flow identification device 240 (e.g., by applying traffic shaping, transrating, transcoding, adaptive bitrate technology, or the like).

As indicated above, FIG. 5 is provided merely as an example. Other examples are possible and can differ from what was described with regard to FIG. 5.

Figure 6:
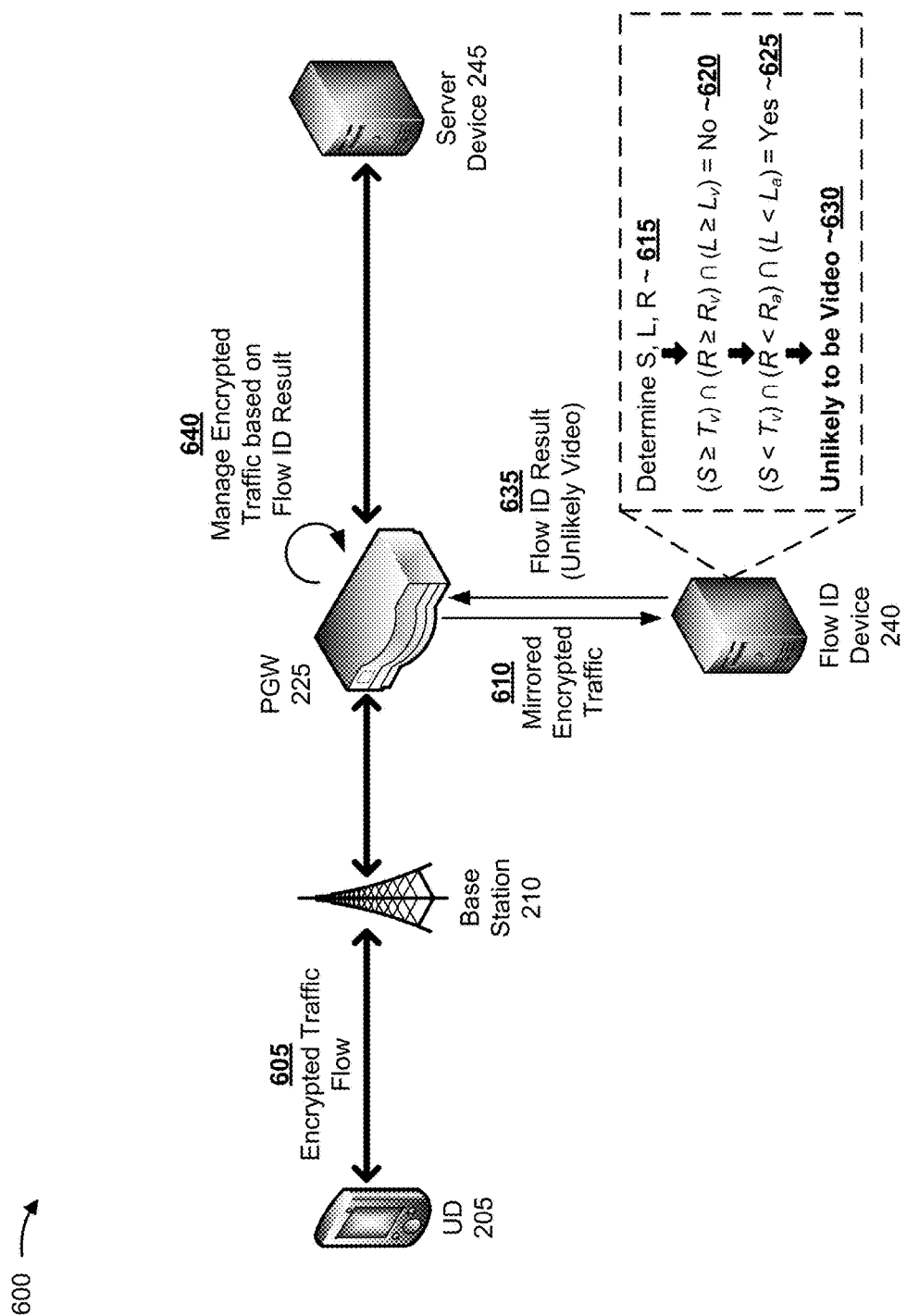
FIG. 6 is a diagram of another example implementation relating to the example process shown in FIG. 4.

FIG. 6 is a diagram of another example implementation 600 relating to example process 400 shown in FIG. 4. As shown in FIG. 6, and by reference number 605, user device 205 and server device 245 can participate in a secured session via which encrypted traffic can be exchanged. As shown by reference number 610, flow identification device 240 receives the encrypted traffic associated with the encrypted traffic flow, based on the traffic being mirrored by PGW 225.

As shown by reference number 615, flow identification device 240 a set of flow characteristics, associated with the encrypted traffic flow, including a cumulative length of payload packets included in the encrypted traffic flow (S), an average payload length of the payload packets (L), and a throughput associated with the encrypted traffic flow (R).

As shown by reference number 620, flow identification device 240 determines that at least one of the cumulative length of the payload packets is not greater than or equal to a threshold length for a video segment ($S \geq T_v$), the throughput of the encrypted traffic flow is not greater than or equal to a threshold throughput for a video traffic flow ($R \geq R_v$), or the average payload length of payload packets is not greater than or equal to a threshold average payload length for a video traffic flow ($L \geq L_v$). As shown by reference number 625, flow identification device 240 then determines that the cumulative length of the payload packets is less than a threshold cumulative length for a video segment ($S < T_v$), the throughput of the encrypted traffic flow is less than a threshold throughput for non-video traffic flow ($R < R_v$), the average payload length of payload packets is less than a threshold average payload length for a non-video traffic flow ($L < L_a$). As shown by reference number 630, based on the second set of three thresholds being satisfied, flow identification device 240 determines that the encrypted traffic flow is unlikely to be a video traffic flow.

As shown by reference number 635, flow identification device 240 provides, to PGW 225, information associated with a result indicating that the encrypted traffic flow is unlikely to be a video traffic flow. As shown by reference number 640, PGW 225 manages the encrypted traffic flow based on the result provided by flow identification device 240 (e.g., PGW 225 increases throughput associated with the encrypted traffic flow).

As indicated above, FIG. 6 is provided merely as an example. Other examples are possible and can differ from what was described with regard to FIG. 6.

Figure 7:
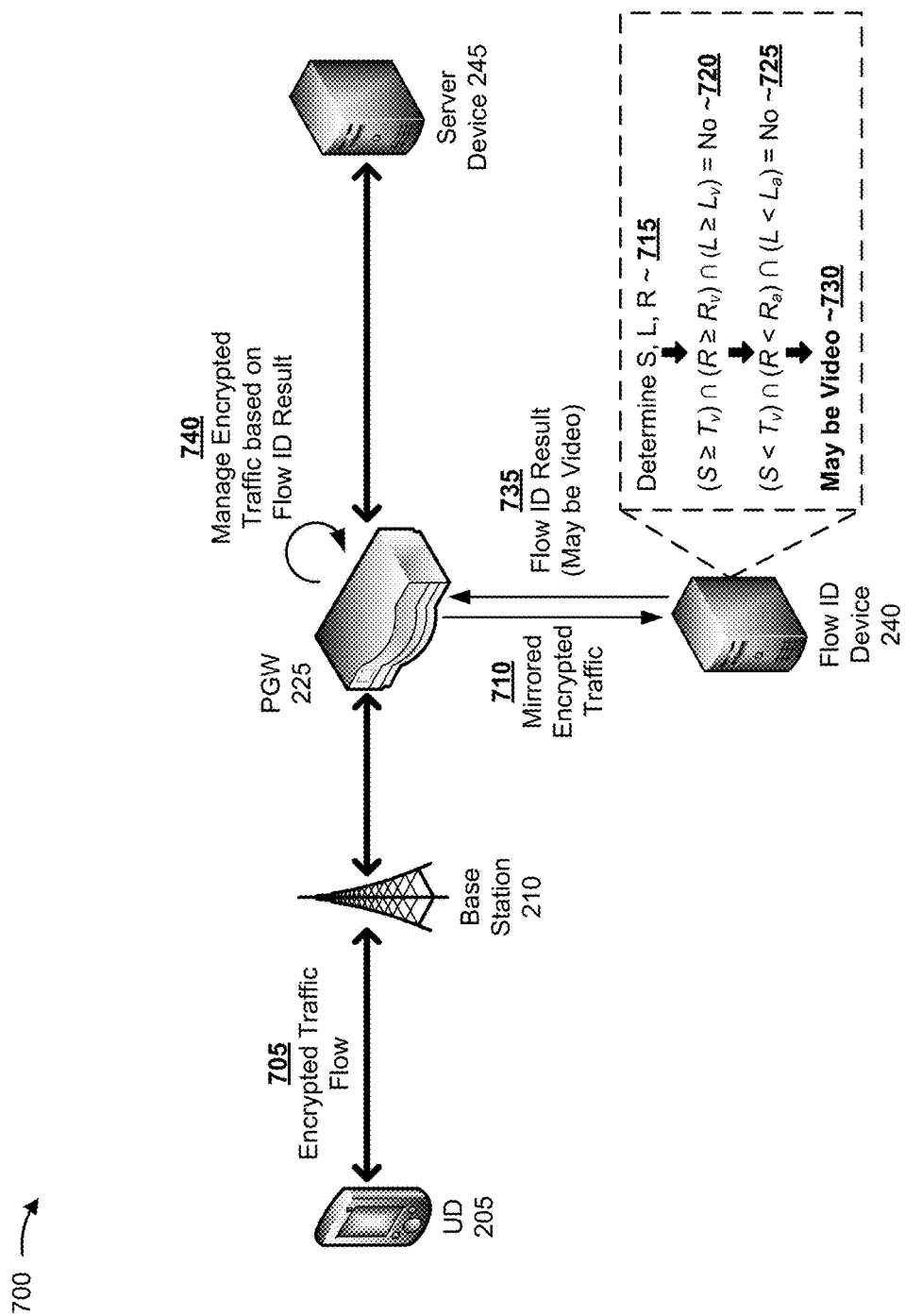
FIG. 7 is a diagram of an additional example implementation relating to the example process shown in FIG. 4.

FIG. 7 is a diagram of an additional example implementation 700 relating to example process 400 shown in FIG. 4. As shown in FIG. 7, and by reference number 705, user device 205 and server device 245 can participate in a secured session via which encrypted traffic can be exchanged. As shown by reference number 710, flow identification device 240 receives the encrypted traffic associated with the encrypted traffic flow, based on the traffic being mirrored by PGW 225.

As shown by reference number 715, flow identification device 240 a set of flow characteristics, associated with the encrypted traffic flow, including a cumulative length of payload packets included in the encrypted traffic flow (S), an average payload length of the payload packets (L), and a throughput associated with the encrypted traffic flow (R).

As shown by reference number 720, flow identification device 240 determines that at least one of the cumulative length of the payload packets is not greater than or equal to a threshold length for a video segment ($S \geq T_v$), the throughput of the encrypted traffic flow is not greater than or equal to a threshold throughput for a video traffic flow ($R \geq R_v$), or the average payload length of payload packets is not greater than or equal to a threshold average payload length for a video traffic flow ($L \geq L_v$). As shown by reference number 725, flow identification device 240 then determines that at least one of the cumulative length of the payload packets is not less than a threshold cumulative length for a video segment ($S < T_v$), the throughput of the encrypted traffic flow is not less than a threshold throughput for non-video traffic flow ($R < R_v$), the average payload length of payload packets is not less than a threshold average payload length for a non-video traffic flow ($L < L_a$). As shown by reference number 730, neither set of thresholds being satisfied, flow identification device 240 determines that the encrypted traffic flow can be a video traffic flow.

As shown by reference number 735, flow identification device 240 provides, to PGW 225, information associated with a result indicating that the encrypted traffic flow can be a video traffic flow. As shown by reference number 740, PGW 225 manages the encrypted traffic flow based on the result provided by flow identification device 240 (e.g., PGW 225 can apply a combination of the techniques applied when the encrypted traffic flow is likely to be a video traffic flow and the techniques applied when the encrypted traffic flow is unlikely to be a video traffic). In some implementations, PGW 225 can apply these techniques until flow identification device 240 makes another determination of whether the encrypted traffic flow is likely to be a video traffic flow is made (e.g., at a later time).

As indicated above, FIG. 7 is provided merely as an example. Other examples are possible and can differ from what was described with regard to FIG. 7.

Implementations described herein provide a flow identification device capable of determining whether an encrypted traffic flow is likely to be a video traffic flow based on a set of flow characteristics associated with the encrypted traffic flow, while preventing any leak of private information associated with the encrypted traffic flow. In some implementations, the flow identification device can cause the encrypted traffic flow to be managed based on whether the encrypted traffic flow is likely to be a video traffic flow, which results in conservation of network resources, efficient use of network resources, and/or improved user experience associated with the encrypted traffic flow.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors, communicatively coupled to the memory, to:
determine a set of flow characteristics associated with an encrypted traffic flow, the set of flow characteristics including:
a cumulative length of payload packets included in the encrypted traffic flow,
an average payload length of the payload packets, and
a throughput of the encrypted traffic flow;
compare the average payload length of the payload packets and a threshold average payload length of payload packets;
determine, based on the set of flow characteristics, whether the encrypted traffic flow is likely to be a video traffic flow based on comparing the average payload length of the payload packets and the threshold average payload length of payload packets for a video traffic flow; and
cause the encrypted traffic flow to be managed based on whether the encrypted traffic flow is likely to be a video traffic flow.

2. The device of claim 1, where the one or more processors are further to:
compare the cumulative length of the payload packets and a threshold length for a video segment; and
where the one or more processors, when determining whether the encrypted traffic flow is likely to be a video traffic flow, are to:
determine whether the encrypted traffic flow is likely to be a video traffic flow based on comparing the cumulative length of the payload packets to the threshold length for a video segment.

3. The device of claim 1, where the one or more processors are further to:
compare the throughput of the encrypted traffic flow and a threshold throughput for a video traffic flow; and
where the one or more processors, when determining whether the encrypted traffic flow is likely to be a video traffic flow, are to:
determine whether the encrypted traffic flow is likely to be a video traffic flow based on comparing the throughput of the encrypted traffic flow and the threshold throughput for a video traffic flow.

4. The device of claim 1, where the one or more processors are further to:
compare the average payload length of the payload packets and a threshold average payload length of payload packets for a non-video traffic flow; and
where the one or more processors, when determining whether the encrypted traffic flow is likely to be a video traffic flow, are to:
determine whether the encrypted traffic flow is likely to be a video traffic flow based on comparing the average payload length of the payload packets and the threshold average payload length of payload packets for a non-video traffic flow.

5. The device of claim 1, where the one or more processors are further to:
compare the throughput of the encrypted traffic flow and a threshold throughput for a non-video traffic flow; and
where the one or more processors, when determining whether the encrypted traffic flow is likely to be a video traffic flow, are to:
determine whether the encrypted traffic flow is likely to be a video traffic flow based on comparing the throughput of the encrypted traffic flow and the threshold throughput for a non-video traffic flow.

6. The device of claim 1, where the one or more processors, when causing the encrypted traffic flow to be managed based on whether the encrypted traffic flow is likely to be a video traffic flow, are to:
cause at least one of traffic pacing, transrating, transcoding, or an adaptive bitrate technique to be applied to the encrypted traffic flow.

7. The device of claim 1, where the one or more processors, when determining the set of flow characteristics associated with the encrypted traffic flow, are to:
determine the set of flow characteristics based on an indication provided by another device.

8. A non-transitory computer-readable medium storing instructions, the instructions comprising:
one or more instructions that, when executed by one or more processors, cause the one or more processors to:
determine a set of flow characteristics associated with an encrypted traffic flow, the set of flow characteristics including:
a cumulative length of payload packets included in the encrypted traffic flow,
an average payload length of the payload packets, and
a throughput of the encrypted traffic flow;
compare the average payload length of the payload packets and a threshold average payload length of the payload packets;
determine, based on the set of flow characteristics, that the encrypted traffic flow is likely to be a video traffic flow based on comparing the average payload length of the payload packets and a threshold average payload length of the payload packets for the video traffic flow; and
manage the encrypted traffic flow based on determining that the encrypted traffic flow is likely to be a video traffic flow.

9. The non-transitory computer-readable medium of claim 8, where the one or more instructions, when executed by the one or more processors, further cause the one or more processors to:
compare the cumulative length of the payload packets and a threshold length for a video segment; and
where the one or more instructions, that cause the one or more processors to determine that the encrypted traffic flow is likely to be a video traffic flow, cause the one or more processors to:
determine that the encrypted traffic flow is likely to be a video traffic flow based on comparing the cumulative length of the payload packets to the threshold length for a video segment.

10. The non-transitory computer-readable medium of claim 8, where the one or more instructions, when executed by the one or more processors, further cause the one or more processors to:
compare the throughput of the encrypted traffic flow and a threshold throughput for a video traffic flow; and
where the one or more instructions, that cause the one or more processors to determine that the encrypted traffic flow is likely to be a video traffic flow, cause the one or more processors to:
determine that the encrypted traffic flow is likely to be a video traffic flow based on comparing the throughput of the encrypted traffic flow and the threshold throughput for a video traffic flow.

11. The non-transitory computer-readable medium of claim 8, where the one or more instructions, that cause the one or more processors to manage the encrypted traffic flow based on determining that the encrypted traffic flow is likely to be a video traffic flow, cause the one or more processors to:
manage the encrypted traffic flow by applying at least one of traffic pacing, transrating, transcoding, adaptive bitrate technology to the encrypted traffic flow.

12. The non-transitory computer-readable medium of claim 8, where the encrypted traffic flow is associated with a secure sockets layer session, a transport layer security session, a secure hypertext transfer protocol session, or a quick user datagram protocol internet connection session.

13. The non-transitory computer-readable medium of claim 8, where the one or more instructions, that cause the one or more processors to determine the set of flow characteristics associated with the encrypted traffic flow, cause the one or more processors to:
determine the set of flow characteristics based on an indication provided by another device.

14. A method, comprising:
determining, by a device, a set of flow characteristics associated with an encrypted traffic flow,
the set of flow characteristics including:
a cumulative length of payload packets included in the encrypted traffic flow,
an average payload length of the payload packets, and
a throughput of the encrypted traffic flow;
comparing, by the device, the set of flow characteristics and a set of thresholds associated with determining whether the encrypted traffic flow is likely to be a video traffic flow;
determining, by the device and based on comparing the set of flow characteristics and the set of thresholds, whether the encrypted traffic flow is likely to be a video traffic flow; and
causing, by the device, the encrypted traffic flow to be managed based on whether the encrypted traffic flow is likely to be a video traffic flow.

15. The method of claim 14, where the set of thresholds includes a threshold length for a video segment, a threshold average payload length of payload packets for a video traffic flow, and a threshold throughput for a video traffic flow, and
where comparing the set of flow characteristics comprises:
comparing the cumulative length of the payload packets and the threshold length for a video segment;
comparing the average payload length of the payload packets and the threshold average payload length of payload packets for a video traffic flow; and
comparing the throughput of the encrypted traffic flow and the threshold throughput for a video traffic flow.

16. The method of claim 15, where determining whether the encrypted traffic flow is likely to be a video traffic flow comprises:
determining that the encrypted traffic flow is likely to be a video traffic flow when the cumulative length of the payload packets satisfies the threshold length for a video segment, the average payload length of the payload packets satisfies the threshold average payload length of payload packets for a video traffic flow, and the throughput of the encrypted traffic flow satisfies the threshold throughput for a video traffic flow.

17. The method of claim 16, where causing the encrypted traffic flow to be managed based on whether the encrypted traffic flow is likely to be a video traffic flow comprises:
causing at least one of traffic pacing, transrating, transcoding, or an adaptive bitrate technique to be applied to the encrypted traffic flow.

18. The method of claim 14, where the set of thresholds includes a threshold length for a video segment, a threshold average payload length of payload packets for a non-video traffic flow, and a threshold throughput for a non-video traffic flow, and
where comparing the set of flow characteristics comprises:
comparing the cumulative length of the payload packets and the threshold length for a video segment;

comparing the average payload length of the payload packets and the threshold average payload length of payload packets for a non-video traffic flow; and comparing the throughput of the encrypted traffic flow and the threshold throughput for a non-video traffic flow.

19. The method of claim 18, where determining whether the encrypted traffic flow is likely to be a video traffic flow comprises:

determining that the encrypted traffic flow is unlikely to be a video traffic flow when the cumulative length of the payload packets does not satisfy the threshold length for a video segment, the average payload length of the payload packets satisfies the threshold average payload length of payload packets for a non-video traffic flow, and the throughput of the encrypted traffic flow satisfies the threshold throughput for a non-video traffic flow.

20. The method of claim 14, further comprising:

providing, to a network device associated with the encrypted traffic flow, an indication of whether the encrypted traffic flow is likely to be a video traffic flow; and where causing the encrypted traffic flow to be managed based on whether the encrypted traffic flow is likely to be a video traffic flow comprises:

causing the encrypted traffic flow to be managed based on providing the indication.

\* \* \* \* \*